United States Patent [19]

Brady et al.

[11] Patent Number: 5,440,507
[45] Date of Patent: Aug. 8, 1995

[54] DIAMOND-LIKE CARBON WRITE-READ OPTICAL STORAGE MEMORY

[75] Inventors: Michael J. Brady, Brewster; Bodil E. Braren, Hartsdale; Richard J. Gambino, Yorktown Heights; Alfred Grill, White Plains; Vishnubhai V. Patel, Yorktown Heights, all of N.Y.

[73] Assignee: International Business Machines Corporation, Armonk, N.Y.

[21] Appl. No.: 350,249

[22] Filed: Dec. 6, 1994

[51] Int. Cl.⁶ .................. G11C 11/42; G11C 13/04
[52] U.S. Cl. ..................... 365/127; 365/113
[58] Field of Search ............. 365/127, 106, 108, 113, 365/119

[56] References Cited

U.S. PATENT DOCUMENTS

| | | | |
|---|---|---|---|
| 4,797,871 | 1/1989 | Tyan et al. | 365/113 |
| 4,839,861 | 6/1989 | Ikegawa et al. | 365/113 |
| 5,272,667 | 12/1993 | Yamada et al. | 365/113 |
| 5,294,518 | 3/1994 | Brady et al. | 365/113 |

Primary Examiner—Terrell W. Fears
Attorney, Agent, or Firm—Robert M. Trepp

[57] ABSTRACT

A method and apparatus for storing data is provided incorporating an amorphous solid having covalent bonds and a first index of refraction and an energy source for thermally heating selected areas of the amorphous solid to change the index of refraction without melting or substantially crystallizing the amorphous solid. The invention overcomes the problem of corrosion, moisture, or microbial attack resulting in deterioration of the storage medium over time, i.e., 100 years.

21 Claims, 2 Drawing Sheets

DIAMOND-LIKE CARBON WRITE-READ OPTICAL STORAGE MEMORY

This is a continuation of application Ser. No. 08/144,907, filed Oct. 28, 1993, now abandoned, this is a division of application Ser. No. 07/877,334, filed May 1, 1992, now U.S. Pat. No. 5,294,518.

FIELD OF THE INVENTION

This invention relates to write-read optical storage memory systems, and more particularly, to write once read many (WORM) memory systems having long retention life using an amorphous material such as diamond-like carbon, as the storage medium.

BACKGROUND OF THE INVENTION

The usual optical techniques for recording information on storage media is done by ablation of thin films with a focused laser beam. The thin film storage media using laser ablation may have very complicated structures, have low signal-to-noise ratios, require large amounts of laser energy, and suffer from degradation with time. Other optical techniques involve pit formation or bubbles in the thin film and in general require a surface deformation of the thin film to modify the optical properties of the active medium. One feature in common with all optical storage systems is the fact that optical storage systems utilize diffraction limited optics which is approximated by the wavelength of the laser light used to modify the material and to read the stored information from the storage media. As the wavelength of the laser light decreases, the optical spot size gets smaller, thus leading to higher bit density optical storage systems.

In U.S. Pat. No. 5,024,927 which issued on Jun. 18, 1991 to K. Yamaria et al., an information recording medium capable of recording and erasing information with the application of electro-magnetic waves is described comprising a recording layer formed on a substrate, the recording layer including a carbon-based material, a polymer prepared by subjecting a pigment to plasma polymerization and an optically reversible material whose optical characteristics can be reversibly changed. The optically reversible material may be finally-divided particles of a metal dispersed in the carbon-based material. The carbon-based material serves as the matrix for the optically reversible material in the recording layer. Specific examples of the optically-reversible materials include chalcogens such as Te and Se, alloys of chalcogens, materials whose crystalline phase is optically changeable, such as Zn—Ag and Cu—Al—Ni, Phthalocyanine-type pigments whose crystalline phase is optically changeable, and organic chalcogen compounds prepared by plasma CVD, such as diphenyl tellurium, diphenyl selenium, dimethyl tellrurium, dimethyl selenium, tellurium diisopropoxy diacetylacetonate and selenium diisopropoxy diacetylacetonate.

In U.S. Pat. No. 4,812,385 which issued on Mar. 14, 1989 to K. C. Pan, a write once read many (WORM) optical memory system is described. A recording laser provides a laser beam through a series of lenses to be focussed as a spot on a rotating disk. The disk has a layer of amorphous thin film material thereon comprising an alloy having a composition within a polygon in a ternary composition diagram of antimony, zinc and tin. Writing is accomplished by heating a location above the transition temperature wherein the amorphous material is converted to a crystalline material. A separate laser is shown for reading data from the rotating disk by detecting the reflectance of the alloy in either the crystalline or amorphous state. The amorphous state is very stable.

It is well known that certain polymers may undergo an irreversible index of refraction change in response to irradiation of ultraviolet light. In U.S. Pat. No. 3,689,264 which issued on Sep. 5, 1972 to E. A. Chandross et al., readily observable irreversible index of refraction changes in poly (methyl methacrylate) sensitized by the addition of ingredients to enable photo-induced cross-linking was described when irradiated with ultraviolet light from a laser.

In U.S. Pat. No. 4,994,347 which issued on Feb. 19, 1991 to W. K. Smothers, a substantially solid, storage stable photopolymerizable composition is described that forms a refractive-index image upon exposure to actinic radiation. The composition consists essentially of: a solvent soluble, thermal plastic polymeric binder; N-vinyl carbazole; and a hexaarylbiimidazole photoinitiator system having a hydrogen donor component.

In U.S. Pat. No. 4,981,777 which issued on Jan. 1, 1991 to M. Kuroiwa et at., a thin optical recording film is described comprising at least one low melting point metal, carbon and hydrogen on a substrate, and heat treating the so formed film on the substrate at a temperature of from 70° to 300° C. for a period of at least 5 seconds. The heat treatment is carried out at a temperature well below the melting point of the low melting point metal contained in the film. It has been found that the recording sensitivity of the recording film can be enhanced by the heat treatment according to the invention. By the term "enhanced recording sensitivity", it is meant reduction in energy of an energy beam such as a laser light required for recording information in unit area of the recording film. The low melting point metal element in the recording film may be tellurium, bismuth, zinc, cadmium, lead and tin used alone or in combination. The carbon content of the recording film is preferably from 5 to 40 atomic percent based on the whole film.

In U.S. Pat. No. 4,647,512 which issued on Mar. 3, 1987 to N. Venkataramanan et al., a plasma assisted chemical vapor transport process is described. The material, diamond-like carbon may be produced by plasma assisted chemical vapor transport (PACVT) process in which hydrogen is employed as the reactive process feedgas and in which the deposition process is conducted in a controllably energetic ion bombardment of the surface on which the film of diamond-like carbon is grown. Further, FIG. 4 of '512 displays the optical transmission of diamond-like carbon films obtained on KBr substrates whose intrinsic transparency is also shown is FIG. 4. The films with a thickness of about ½ micrometer exhibit high transparency at UV wavelength. The films exhibit a transparency of more than 50% for wavelengths above about 200 nm and more than 90% above about 400 nm. The films also exhibit a high index of refraction, about 2 at 850 nm.

The use of diamond-like carbon film as a protective coating on magnetic media has been described in U.S. Pat. No. 4,647,494 which issued on Mar. 3, 1987 to B. S. Meyerson et al. and assigned to the assignee herein. The diamond-like carbon layer provided a superior wear-resistant coating over the metallic magnetic recording layers. An intermediate layer of silicon having a minimum thickness of a few atomic layers was formed between the diamond-like carbon protective layer and the metallic magnetic recording layer to provide strong adhesion. The diamond-like carbon layer was plasma deposited.

In U.S. Pat. No. 4,833,031 which issued on May 23, 1989 to H. Kurokawa et at., a protective film was described made of a diamond-like carbon film and an organic compound film over a ferromagnetic metal recording film. The protective film provided excellent durability and small spacing loss and as a result high density magnetic recording was obtainable. The organic film on the amorphous carbon film included an organic compound having at least one fatty alkyl group having at least 8 carbon atoms at the end of a molecular structure thereof.

In a publication by A. Grill et al. entitled, "Bonding, interfacial effects and adhesion in DLC", SPIE, Vol. 969, Diamond Optics (1988), the structure and optical properties of diamond-like carbon (DLC) films are described. Diamond-like carbon films may contain $sp^2$, $sp^3$ and even $sp^1$ coordinated carbon atoms in a disordered network. The ratio between the carbon atoms in the different coordinations of carbon atoms is to a great extent determined by the hydrogen content of the films. Typically, diamond-like carbon layers are seen to be weakly absorbing in the visible spectrum, tending toward transparent in the infrared spectrum. Their transparency makes diamond-like carbon films good candidates as a protective optical coating.

In a publication by V. Y. Armeyev et al. entitled, "Direct laser writing of conductive pathways into diamond-like carbon films", SPIE, Vol. 1352, Laser Surface Microprocessing, pp. 200, (1989), microprocessing of diamond-like carbon films with a continuous wave argon laser at 488 nm wavelength was described. Conductive lines were formed in the amorphous carbon films several micrometers wide having a resistivity of about $4 \times 10^{-2}$ $\Omega$cm. The conductive lines were formed by graphitization as evidenced by Raman spectroscopy. The graphitization temperature threshold lies in the range from 400° to 500° C. The etching threshold where carbon is oxidized is found in the temperature range near 600° C. The use of diamond-like carbon as the active material for once-write optical recording is suggested, if the change in reflectance due to local graphitization is high enough. By using a finely focused He—Ne laser beam at 0.633 nm, the contrast in reflectivity was about 2 for scanning a graphitized spot against the as-deposited film. The graphitized strip was written at a power of 740 milliwatts.

In a publication by S. Prawer et al. entitled, "Pulsed laser treatment of diamond-like carbon films", Appl. Phys. Lett. 48, 1585 (1986), conducting pathways having a resistance of 0.10 $\Omega$cm were formed in insulating ($10^6$ $\Omega$cm) diamond-like carbon film using pulsed laser irradiation at 0.53 micrometer. Below a laser intensity threshold of 0.2 J/cm$^2$ of a pulsed, 70 ns, neodymium: yttrium aluminum garnet operating at 0.53 micrometers, there was no observable interaction between the laser and the film. Above 0.2 J/cm$^2$, the diamond-like carbon film was partially graphitized and the effected region displayed a terrace-like structure with sharp edges. Two processes were described resulting from the interaction of the laser with the diamond-like carbon film. The diamond-like carbon film was transformed into a form of graphite for laser intensities exceeding a threshold of about 0.2 J/cm$^2$ and ablation of the graphite occurs.

In a publication by M. Rothschild et al. entitled, "Excimer-laser etching of diamond and hard carbon films by direct writing and optical projection", J. Vac. Sci. Technol. B, 4, 310 (1986), diamond-like carbon thin films were explored as positive-acting resist for semiconductor patterning. An ArF laser at 193 nm wavelength, was particularly suitable for interaction with diamond-like carbon, since the proton energy at this wavelength 6.4 eV is higher than the bandgap of diamond 5.4 eV. The crystal was highly absorptive. Crystalline diamond and diamond-like carbon thin films were etched with the Excimer laser. Deep structures, about 15 micrometers, were obtained in the direct write configuration and linewidths less than the laser wavelengths were generated in optical projection. The laser-induced etching takes place via surface graphitization, by a combined thermal/photochemical conversion, followed by sublimation and/or reaction.

In a publication by R. J. Gambino et al. entitled, "Spin resonance spectroscopy of amorphous carbon films, Solid State Comm., Vol. 34, pp. 15–18 (1980), printed in Great Britain, amorphous carbon was prepared by the plasma decomposition of propane providing a film which was hard, transparent, insulator much like diamond in its physical properties. The composition of amorphous carbon is described as being a random network of $sp^3$ and $sp^2$ bonded carbon with the relative fraction of each depending on the method of preparation and the process parameters.

SUMMARY OF THE INVENTION

In accordance with the present invention, a method and apparatus for storing data is described comprising the steps of: selecting an amorphous solid having atoms therein covalently bonded together, for example, diamond-like carbon, silicon carbide, boron carbide, boron nitride, amorphous silicon and amorphous germanium having a first index of refraction, and heating the amorphous solid in predetermined areas to change the index of refraction in the heated areas to a second index of refraction, the selected amorphous solid having a plurality of covalent bonds which may be modified by heating to a predetermined temperature without melting or crystallizing the amorphous solid.

It is an object of the invention to use a focussed optical or laser beam to provide a heat source to heat an amorphous solid in a localized area.

It is a further object of the invention to provide an amorphous to an amorphous transformation of a selected solid, for example, diamond-like carbon.

It is a further object of the invention to utilize diamond-like carbon as the amorphous solid and to provide a transformation of some covalent bonds from $sp^2$ to $sp^3$ whereby the density of the amorphous solid increases thereby changing the index of refraction of the material.

It is a further object of the invention to perform an amorphous to amorphous transformation of the covalently bonded material without melting the material or forming crystals therein so as to form a crystalline material.

It is a further object to provide a second stable state of amorphous material from a first state having a mixture of $sp^2$ and $sp^3$ bonds by converting $sp^2$ bonds to $sp^3$ bonds in the covalently bonded material.

It is a further object of the invention to select carbon as the amorphous material having substantially $sp^3$ diamond type bonding.

It is a further object of the invention to provide localized heating of a covalently bonded amorphous solid to convert $sp^2$ bonds to $sp^3$ bonds as a function of the thermal energy deposited in the localized area.

It is a further object of the invention to provide an amorphous to amorphous transformation in covalently bonded material wherein the density of the material changes resulting in a change of the index of refraction, which in turn produces a change in reflectance.

BRIEF DESCRIPTION OF THE DRAWINGS

These and other features, objects, and advantages of the present invention will become apparent upon a consideration of the following detailed description of the invention when read in conjunction with the drawing, in which.

DESCRIPTION OF THE PREFERRED EMBODIMENT

Figure 1:
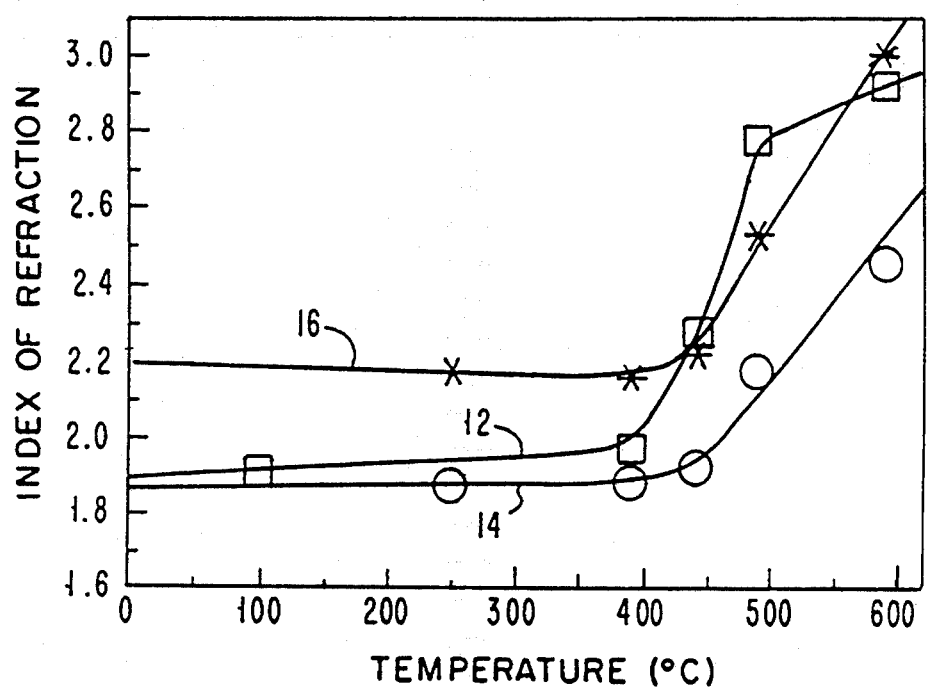
FIG. 1 shows a graph of the index of refraction versus the anneal temperature of several diamond-like carbon films.

Referring now to the drawing, FIG. 1 shows a graph of the index of refraction versus the anneal temperature of several diamond-like carbon films. In FIG. 1, the ordinate represents the index of refraction and the abscissa represents the temperature in degrees Celsius. The diamond-like carbon films used for generating the data in FIG. 1 were formed by plasma assisted chemical vapor deposition (PACVD). Curve 12 represents data from a diamond-like carbon film deposited at a substrate temperature of 100° C. with a substrate bias voltage of −80 volts. As can be seen in FIG. 1, as the anneal temperature of a selected area of the film increases, the index of refraction likewise increases. Curve 14 shows data obtained from a diamond-like carbon film deposited on a substrate at 250° C. with a substrate bias voltage of −80 volts. Curve 16 represents data obtained from a diamond-like carbon film deposited at a substrate temperature of 250° C. with a substrate bias voltage of −150 volts. A substantial change in the index of refraction is shown in FIG. 1 when the anneal temperature is raised to a temperature in the range from 450° C. to 600° C. A film deposited at a substrate temperature of 100° C. has an index of refraction of 1.9 and an index of refraction of 2.9 after experiencing an anneal temperature of 600° C. The large change in the index of refraction can be induced by local heating of the diamond-like carbon film using a focussed laser beam. A metal film or layer 64 shown in FIG. 4 may be deposited on the substrate or disc 48 prior to depositing layer 68 which may be a diamond-like carbon film to provide a thin metallic mirror by way of layer 64 below layer. 68. The thickness of the diamond-like carbon film or layer 68, which may be in the range from 4 nm to 1,000 nm, may be selected for minimum reflection which should be a thickness of one quarter wavelength or a multiple of (2n+1) quarter wavelengths where n is an integer, for example about 30 nm. Information may be written into the diamond-like carbon film by local annealing of the diamond-like carbon film or layer 68 via a laser spot, or by projection of a plurality of spots, or by a suitable energy source which imparts thermal energy to the diamond-like carbon film or layer 68 which induces a change in the index of refraction of the diamond-like carbon film or layer 68 in the selected area, a change in reflectance and a change in layer 68 thickness.

Figure 3:
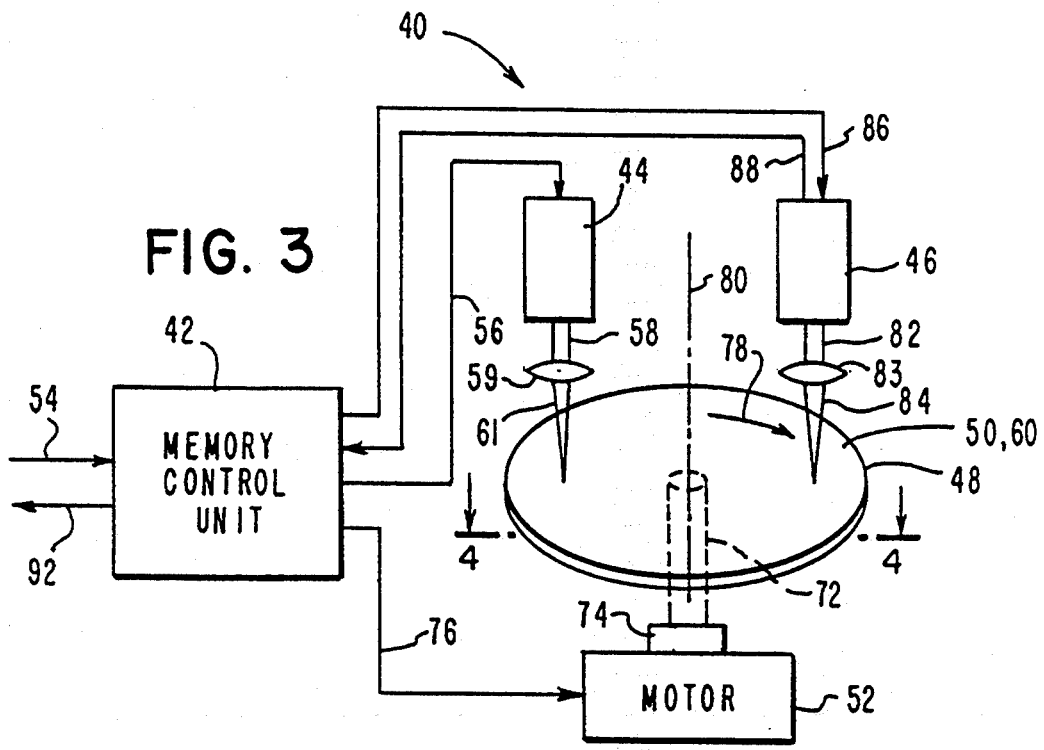
FIG. 3 shows one embodiment of the invention.

After information is written into the diamond-like carbon film, the information may be read out many times which is described in more detail in reference to FIG. 3. A light beam 84 scans the diamond-like carbon film or storage media 50 as it moves below light beam 84 on disc 48 shown in FIG. 3 and detects the index of refraction or the reflectance such as by a laser beam 84 which is reflected from the metal mirror or layer 64, shown in FIG. 4, below the diamond-like carbon film or storage media 50 and from the diamond-like carbon film or storage media itself. The reflected beam, which is intensity modulated as it scans the diamond-like carbon film or storage media 50, may be detected or sensed by a photo diode and allows data to be read back from the storage media due to the different intensity levels of reflected light, due to the variation in the index of refraction of the unexposed and tire exposed areas of storage media 50. The photo diode may be a quadrant detector to provide tracking information to a servo control loop for pointing light beam 84. Light beam 84 should be monochromatic light for focussing but does not need to be coherent. A non-laser light source that is monochromatic would be suitable.

Figure 2:
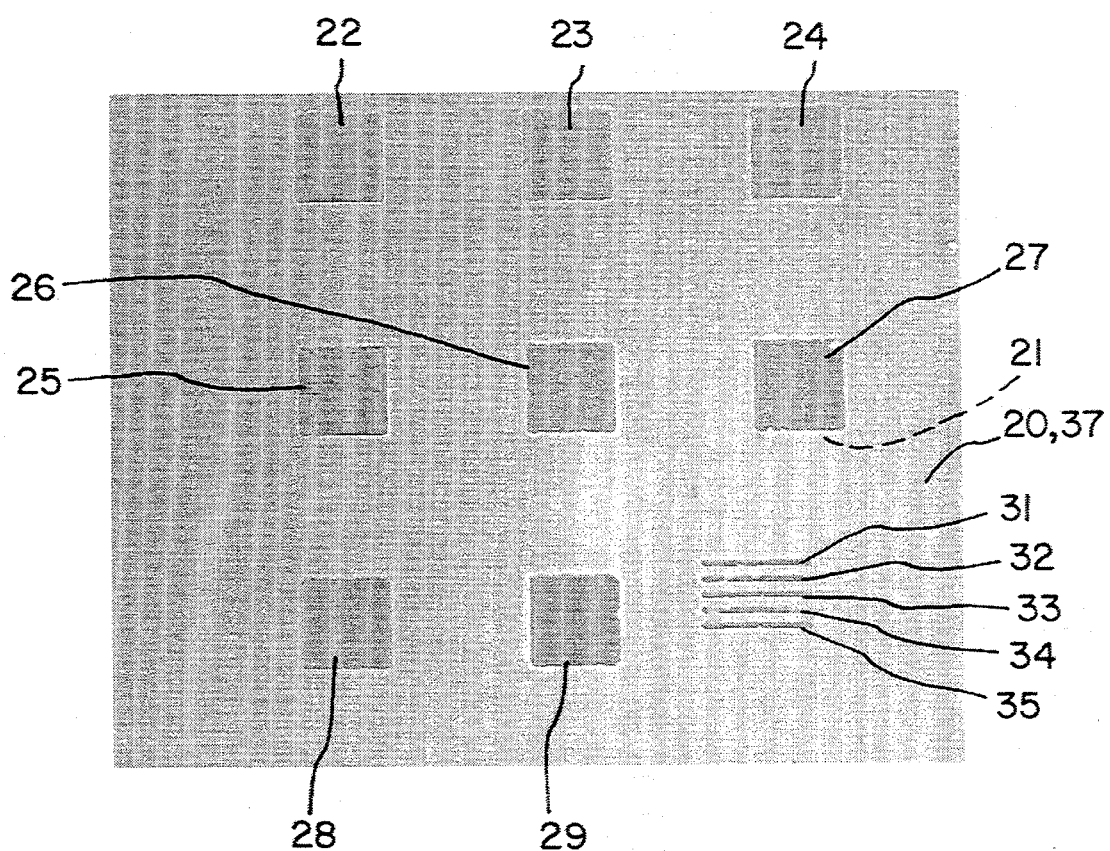
FIG. 2 shows diamond-like carbon film patterned with an Excimer laser at 248 nm.

FIG. 2 shows a diamond-like carbon film patterned with an Excimer laser at 248 nm. In FIG. 2, a thin film 20 of diamond-like carbon was deposited on a substrate 21 by plasma assisted chemical vapor deposition technique (rf or dc powered) with a thickness on the order of 60 nm. The feedgas supplied to the reactor was acetylene or cyclohexane or any other hydrocarbon gas or vapor. Tire pressure during PACVD was in the range from 30 to 300 mTorr. Thin film 20 was low in hydrogen content. Thin film 20 typically contains 10 to 50 atomic percent hydrogen. A metal mask (not shown) having openings therein was placed over the thin film 20. Thin film 20 was exposed through openings in the metal mask to radiation at 248 nm from an Excimer laser with a sequence of 8 pulses, each pulse having an energy density of 133 mJ/cm$^2$. Each laser pulse may have a pulse width in the range from 10 to 50 nanoseconds and a repetition rate of 1 hertz. It is believed that the diamond-like carbon film 20 is cooled down during the 1 second after each laser pulse. The laser pulse may have an energy density in the range from 100 to 200 mJ/cm$^2$. By utilizing a wavelength from the laser of 248 nm, the minimum focussed spot size may be in a range from 0.3 to 0.5 micrometers. Therefore, the density of the data stored on respective areas of film 20 is controlled by the diffraction limited optics, i.e., the minimum spot size that may be focused. In FIG. 2, squares 22 through 29 show film 20 after being annealed by 8 pulses from an Excimer laser. Each square is approximately 600 micrometers on a side. Stripes 31 through 35 shown in FIG. 2 are parallel to one another, 50 micrometers wide and spaced apart from one another by 50 micrometers and about 700 micrometers long. The light contrast in unexposed film 37 which are light compared to squares 22–29 and stripes 31 through 35 which are dark is the result of the change of the index of refraction of the respective film squares 21–29 and stripes 31-35 following 8 laser pulses having an energy density of 133 mJ/cm$^2$ per pulse. After exposure of film 20 by the laser through a metal mask positioned on film 20, the metal mask was removed.

The change in the index of refraction of the diamond-like carbon film 20 is believed to be due to converting $sp^2$ bonds to $sp^3$ bonds in the exposed material on film 20 which, in turn, increases the density of the material. Examples of covalently bonded solid material include amorphous semiconductors, for example, diamond-like carbon, silicon carbide, boron carbide, boron nitride, amorphous silicon, and amorphous germanium. The existence and quantity of covalent bonds $sp^2$ and or $sp^3$ may be measured by laser Raman spectroscopy and also by Electron Energy Loss spectroscopy. It is noted that in amorphous diamond-like carbon, the $sp^2$ bonds are relatively weak bonds and that the diamond-like carbon structure is a 3-dimensional structure with the $sp^2$ bonds and the $sp^3$ bonds being oriented at different angles with respect to the arrangement of the atoms.

FIG. 3 shows an optical storage memory system 40 comprising a memory control unit 42, a write laser 44, a read laser 46, a disc 48 having storage-media 50, and a motor 52 for moving the storage media 50. Memory control unit 42 may receive data over lead 54 for writing into storage media 50. Memory control 42 functions in response to the write data lead 54 to provide control signals and write data on lead 56 to an input of write laser 44. Write laser 44 functions to provide a laser beam 58 which is directed through lens 59 to the upper surface 60 of disc 48 to write data into storage media 50. As shown in FIG. 3, lens 59 provides a focussed laser beam 61 focussed on surface 60 of disc 48. Alternatively, lens 59 may include means to project a pattern or a plurality of spots on upper surface 60 of disc 48 to write in data. In FIG. 3, focussed laser beam 61 may include means for scanning or positioning focussed laser beam 61 with respect to upper surface 60 or motor 52 may position a selected area of surface 60 underneath focussed laser beam 61.

Memory control unit 42 may control write signals such as pulse duration, pulse repetition, pulse power or energy to write laser 44.

Figure 4:
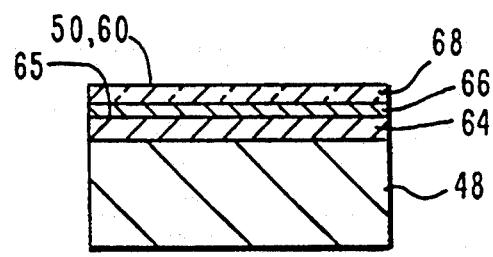
FIG. 4 is a cross-section view along the line 4—4 of FIG. 3.

FIG. 4 shows a cross-section view of disc 48 along the line 4—4 of FIG. 3. Disc 48 provides a mechanical substrate for supporting storage media 50. Disc 48 may be, for example, glass, aluminum, plastic, ceramic, silicon, or other suitable material. A metal layer 64 may be deposited on the upper surface of disc 48. Metal layer 64 functions to provide a mirror to reflect optical energy arriving at its upper surface 65. Metal layer 64 may be, for example, aluminum, gold, chromium, etc. A layer 66 is deposited on upper surface 65 which may be very thin, for example, a few angstroms to several thousand angstroms thick and functions to provide an adhesion layer between metal layer 64 and a layer 68 of amorphous material to be deposited above layer 66. Layer 68 is deposited over layer 66 and may be, for example, a covalently bonded solid material selected from the group consisting of diamond-like carbon, silicon carbide, boron carbide, boron nitride, amorphous silicon, amorphous germanium or the hydrogenated forms of such materials. Hydrogenated forms of such material may have up to 50 atomic percent hydrogen. The hydrogen is covalently bonded to the carbon. The material for layer 66 is selected to provide good adhesion to layer 68 and may be, for example, silicon. The thickness of layer 68 and 66 may be adjusted to provide a quarter wavelength thickness or a multiple quarter wavelength thickness for the intended light source used to receive the minimum reflected light for writing and reading or sensing the index of refraction or the reflectance of layer 68. Using a reflection minimum as the initial state or condition of the storage media reduces the laser power or light power needed to heat selected areas of the storage media to write information in the storage media.

As shown in FIG. 3, disc 48 is supported and rotated by spindle 72. Spindle 72 is supported by bearing 74 and rotated by motor 52. A control signal from memory control unit 42 over lead 76 functions to control through control signals motor 52. Control signals on lead 76 may direct motor 52 to start, spin up to a certain RPM, to slow down and to stop. Motor 52 may rotate at, for example, 3600 RPM or 1 revolution per second. Disc 48 may rotate clockwise as shown by arrow 78 about axis 80 which passes through the center of spindle 72.

Read laser 46 provides a laser beam 82 which is directed through lens 83 to surface 60 of disc 48. Lens 82 may provide a focussed laser beam 84 which is focussed on surface 60. Memory control unit 42 provides control signals over lead 86 to read laser 46. Memory control unit 42 may direct read laser 46 at appropriate times to read data from layer 68 on disc 48 and may provide signals for positioning a focussed laser beam 84 on disc 48 by a positioning means (not shown). Read laser 46 functions to generate laser beam 82 which may be low power, for example, in the range from 1 to 10 milliwatts if a continuous laser beam and 1 to 10 mJ per pulse if a pulsed laser beam and to contain means for detecting changes in the reflectance or index of refraction of layer 68 of storage media 50 by way of the reflected beam from layer 68 through lens 83 to read laser 46 or through another suitable lens to another photo detector, for example, a photo diode (not shown). The intensity of the reflected beam may vary which provides an indication of the reflectance or the index or refraction. Read laser 46 functions to provide a signal over lead 88 indicative of the data stored in layer 68 by the reflectance or the index of refraction of layer 68 obtained from the reflected laser beam 84. Lead 88 is coupled to an input of memory control unit 42 which in turn may process the data, if necessary, and provides an output signal on lead 92 indicative of the data stored on storage media 50 obtained from reflected laser beam 84.

The invention is applicable to all covalently bonded amorphous materials where an amorphous to amorphous transformation may be obtained with a material having a high enough crystallization or melting temperature so that the transformation is obtained without being overridden by crystallization of the material.

While the present invention has been shown and described with respect to specific embodiments, it is not thus limited. Numerous modifications, changes, and improvements will occur which fall within the spirit and scope of the invention.

Having thus described my invention, what I claim as new and desire to secure by Letters Patent is:

1. An optical storage memory system comprising:
    a disc having an amorphous solid on its upper surface for storing data in said amorphous solid,
    a source of optical energy for sensing selected areas of said amorphous solid on said disc,
    means for positioning said selected area and said optical energy whereby said optical energy intercepts said selected area,
    said selected areas having respective data stored therein corresponding to amorphous solid characteristics selected from the group consisting of index of refraction and reflectance, and means for recovering said respective data from said optical energy after intercepting said selected areas.

2. The optical storage memory system of claim 1 wherein said amorphous solid is selected from the group consisting of diamond-like carbon, silicon carbide, boron carbide, boron nitride, amorphous silicon, and amorphous germanium.

3. The optical storage memory system of claim 1 wherein said amorphous solid is selected from the group consisting of diamond-like carbon, silicon carbide, boron carbide, boron nitride, amorphous silicon, and amorphous germanium with up to 50 atomic percent hydrogen which is covalently bonded to said amorphous solid.

4. The optical storage memory system of claim 1 wherein said means for recovering said respective data includes detecting the variation in the index of refraction with respect to said selected areas.

5. The optical storage memory system of claim 1 wherein said means for recovering said respective data includes detecting the variation in reflectance with respect to said selected areas.

6. An optical storage memory media comprising:
a disc having an upper surface,
a layer of an amorphous solid on said upper surface for storing data in selected areas in said amorphous solid,
said selected areas having respective data stored therein corresponding to amorphous solid characteristics selected from the group consisting of index of refraction and reflectance.

7. The optical storage memory media of claim 6 wherein said amorphous solid is selected from the group consisting of diamond-like carbon, silicon carbide, boron carbide, boron nitride, amorphous silicon, and amorphous germanium.

8. The optical storage memory media of claim 6 wherein said amorphous solid is selected from the group consisting of diamond-like carbon, silicon carbide, boron carbide, boron nitride, amorphous silicon, and amorphous germanium with up to 50 atomic percent hydrogen which is covalently bonded to said amorphous solid.

9. The optical storage media of claim 6 wherein said selected areas have respective data stored therein according to the variation in the index of refraction.

10. The optical storage memory media of claim 6 wherein said selected areas have respective data stored therein according to the variation in reflectance.

11. The optical storage memory media of claim 6 further including a metal layer to provide a mirror to reflect optical energy positioned between said disc and said layer of an amorphous solid.

12. The optical storage memory media of claim 11 wherein said metal layer is selected from the group consisting of aluminum, gold and chromium.

13. The optical storage memory media of claim 11 further including an adhesion layer positioned between said metal layer and said layer of an amorphous solid.

14. The optical storage memory media of claim 6 wherein said layer of an amorphous solid includes a substantially covalently bonded amorphous solid.

15. The optical storage memory media of claim 6 wherein said layer of an amorphous solid includes carbon having substantially $sp^3$ diamond type bonding.

16. The optical storage memory media of claim 6 wherein said layer of an amorphous solid includes carbon having substantially $sp^3$ diamond type bonding with a substantial amount of hydrogen which is covalently bonded to $sp^3$ type carbon.

17. The optical storage memory media of claim 6 wherein said layer of an amorphous solid include first selected areas of an amorphous solid wherein the index of refraction is less than 1.9 at 23° C.

18. The optical storage memory media of claim 6 wherein said layer of an amorphous solid include first selected areas of an amorphous solid wherein the index of refraction is in the range from 1.3 to 2.9 at 23° C.

19. The optical storage memory media of claim 18 wherein said layers of an amorphous solid include second selected areas of an amorphous solid wherein the index of refraction is in the range from 1.4 to 3.0 at 23° C.

20. The optical storage memory media of claim 19 wherein the difference between the index of refraction of said first selected areas and the index of refraction of said second selected areas is at least 0.1.

21. The optical storage memory media of claim 19 wherein the difference between the index of refraction of said first selected areas and the index of refraction of said second selected areas is at least 0.4.

* * * * *